United States Patent [19]
Ohta et al.

[11] Patent Number: 5,517,633
[45] Date of Patent: May 14, 1996

[54] SYSTEM FOR CONTROLLING AN INTERNALLY-INSTALLED CACHE MEMORY

[75] Inventors: Hidenobu Ohta; Taizo Sato, both of Kawasaki, Japan

[73] Assignee: Fujitsu Limited, Kawasaki, Japan

[21] Appl. No.: 406,785

[22] Filed: Mar. 20, 1995

Related U.S. Application Data

[63] Continuation of Ser. No. 187,133, Jan. 27, 1994, abandoned, which is a continuation of Ser. No. 643,961, Jan. 22, 1991, abandoned.

[30] Foreign Application Priority Data

Jan. 22, 1990 [JP] Japan ..................... 2-012220

[51] Int. Cl.$^6$ .............. G06F 12/06; G06F 13/00
[52] U.S. Cl. ............... 395/473; 395/421.02; 395/421.1; 395/445; 364/243.41; 364/243.44; 364/247.8; 364/251.3; 364/255.1; 364/256.6; 364/DIG. 1
[58] Field of Search ............... 364/243.45, 251.3, 364/243.41, 243.44, 247.8, 251.3, 255.1, 256.6; 395/421.02, 421.10, 445, 473

[56] References Cited

U.S. PATENT DOCUMENTS

| | | | |
|---|---|---|---|
| 4,332,010 | 5/1982 | Messina et al. | 364/200 |
| 4,618,926 | 10/1986 | Kubo et al. | 364/200 |
| 4,683,533 | 7/1987 | Shiozaki et al. | 364/200 |
| 4,797,814 | 1/1989 | Brenza | 395/425 |
| 4,926,317 | 5/1990 | Wallach et al. | 364/200 |
| 4,943,914 | 7/1990 | Kubo | 364/200 |
| 4,985,829 | 1/1991 | Thatte et al. | 364/200 |
| 4,991,081 | 2/1991 | Bosshart | 364/200 |
| 5,003,459 | 3/1991 | Ramanujan et al. | 395/425 |
| 5,029,070 | 7/1991 | McCarthy et al. | 395/425 |
| 5,109,335 | 4/1992 | Watanabe | 395/400 |
| 5,119,290 | 6/1992 | Loo et al. | 395/400 |
| 5,155,824 | 10/1992 | Edenfield et al. | 395/425 |
| 5,210,845 | 5/1993 | Crawford et al. | 395/425 |
| 5,226,133 | 7/1993 | Taylor et al. | 395/400 |

FOREIGN PATENT DOCUMENTS 0313857  5/1989  European Pat. Off. .

OTHER PUBLICATIONS

Proceedings of IEEE International Conference on Computer Design: VLSI In Computers & Processors 1987, Washington, IEEE Comp. Soc. Press; US pp. 168–172; Alpert et al: Architecture of the NS32532 Microprocessor *p. 171, left column, line 31—right column line 11; FIGS 4, 5*.

Primary Examiner—Tod R. Swann
Assistant Examiner—Frank J. Asta
Attorney, Agent, or Firm—Armstrong, Westerman, Hattori, McLeland & Naughton

[57] ABSTRACT

A cache uses A bits of an offset portion which are not subjected to the address translation of the logical address and B bits of the portion other than the offset portion, which are subjected to an address translation. It has an address monitor portion having a tag portion corresponding to the tag portion of the CPU using only A bits of the offset portion of the set address which are used as the set address in the cache and having a $2^B \times N$-way set associative structure and a portion for making said tag portion of the cache correspond to said tag portion of the address monitor portion, thereby performing management of N address stored in the tag portion of the address monitor portion and transmitting the result of the management of the address to the cache and for invalidating the corresponding recording portion of the tag in the cache.

13 Claims, 10 Drawing Sheets

Fig.1A

| LA(31:12) | PA(31:12) |
|---|---|
| 00000 00000 00001 | 00000 00000 00001 |
| 00000 00000 00002 | 00000 00000 00003 |
| 00000 00000 00003 | 00000 00000 00002 |
| 00000 00000 00004 | 00000 00000 00004 |
| 00000 00000 00005 | 00000 00000 00005 |

Fig.1B

| LA(31:0) | PA(31:0) | DATA(31:0) |
|---|---|---|
| 00002000 | 00003000 | 33333333 |
| 00003000 | 00002000 | 22222222 |
| 00004000 | 00004000 | 44444444 |
| 00005000 | 00005000 | 55555555 |

Fig.1C

| SET ADDRESS LA(14:4) | TAG PORTION PA(31:12) | V | CACHE MEMORY PORTION DATA(31:0) FOR 4 WORDS |
|---|---|---|---|
| 200 | 00003 | 1 | 33333333 ⋯ |
| 300 | 00002 | 1 | 22222222 ⋯ |
| 400 | 00004 | 1 | 44444444 ⋯ |
| 500 | 00005 | 1 | 55555555 ⋯ |

LA(14:4) ⟶

V: VALID BIT

SYSTEM FOR CONTROLLING AN INTERNALLY-INSTALLED CACHE MEMORY

This application is a Continuation application of Ser. No. 08/187,133, filed Jan. 27, 1994, abandoned, which is a Continuation of Ser. No. 07/643,961, filed Jan. 22, 1990, now abandoned.

BACKGROUND OF THE INVENTION

The present invention relates to a system for controlling an internally-installed cache memory to maintain consistency between a main memory and an internally-installed cache in a data processing apparatus and for internally-installing the cache into which the data in the main memory is copied.

To meet recent demand for a high-speed data-processing apparatus, the data access to the main memory must be speeded up. Therefore, a cache memory for copying data from the main memory is provided in the data processing apparatus and the cache is made larger.

To raise the performance of the apparatus, increased use has been made of a multi-processor structure with a plurality of micro-processors (MPUs) instead of a single micro-processor, and of a system in which a DMA controller is used to speed up transmission speed between memories.

Where a system with such a structure has a cache memory installed in an MPU/CPU, it is nonsense that data of the main memory in which the content has already been changed because another processor has written data in the main memory is maintained in the internally-installed cache memory. Thus, it is necessary to maintain consistency between the internally-installed cache memory and the main memory.

To maintain consistency between the internally-installed cache memory and the main memory, a function called an address monitor is conventionally used. This address monitor observes the system bus to which the main memory is connected. When the other bus master produces a write signal for the main memory, the address monitor reads the address on the system bus and compares it with the content in the tag portion of the internally-installed cache memory. When the address accords with the content in the tag portion, the corresponding data in the internally-installed cache memory is invalidated. Thus, consistency is maintained between the main memory and the internally-installed cache memory.

As an ordinary program is written using a logic address, it is necessary to translate the logic address to a physical address so that the program can be operated on an actual hardware. This operation is called an address translation.

The offset portion of the logical address subjected to this address translation is not changed in the physical address and the portion other than the offset portion is not the same as that of the physical address when the logical address is translated to the physical address according to the address translation table.

As the internally-installed cache is small in the conventional data processing apparatus, only the offset portion of the logical address is used as a set address, thereby forming an N-way set associative cache. In this case, the offset portions of the logical address and the physical address are the same, even if they are subjected to address translation. Therefore, the physical address output on the system bus is directly used to determine a set address of cache to be subjected to a comparison and to access the set address of the cache in which the content corresponding to the physical address is stored.

Where, in accordance with a request for a larger cache memory, the cache is made larger, the offset portion is insufficient for the set address. A bit position for which the logical address may be different from the physical address is used.

When the physical address of the system bus is used as the set address of the cache, there is no problem when the logical address is the same as the physical address. When the logical address is different from the physical address, the conventional control invalidates a different content of the cache memory and the portion of the cache memory which should be invalidated remains valid.

Figure 1A:
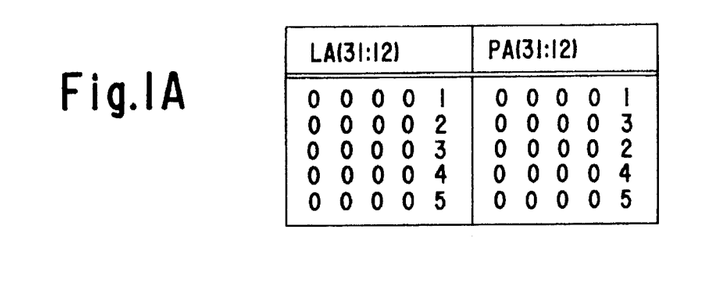
FIGS. 1A to 1C show views of a state explanation of the cache to explain the problem to be solved by the present invention.
Figure 1B:
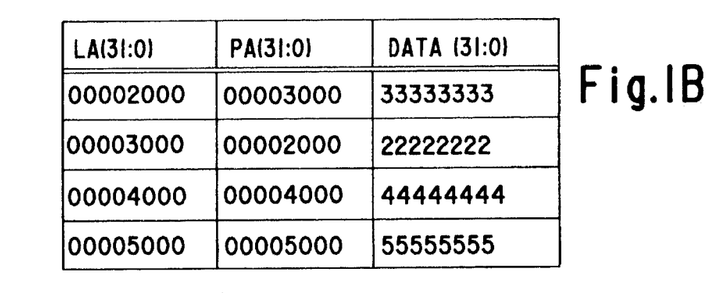
Figure 1C:
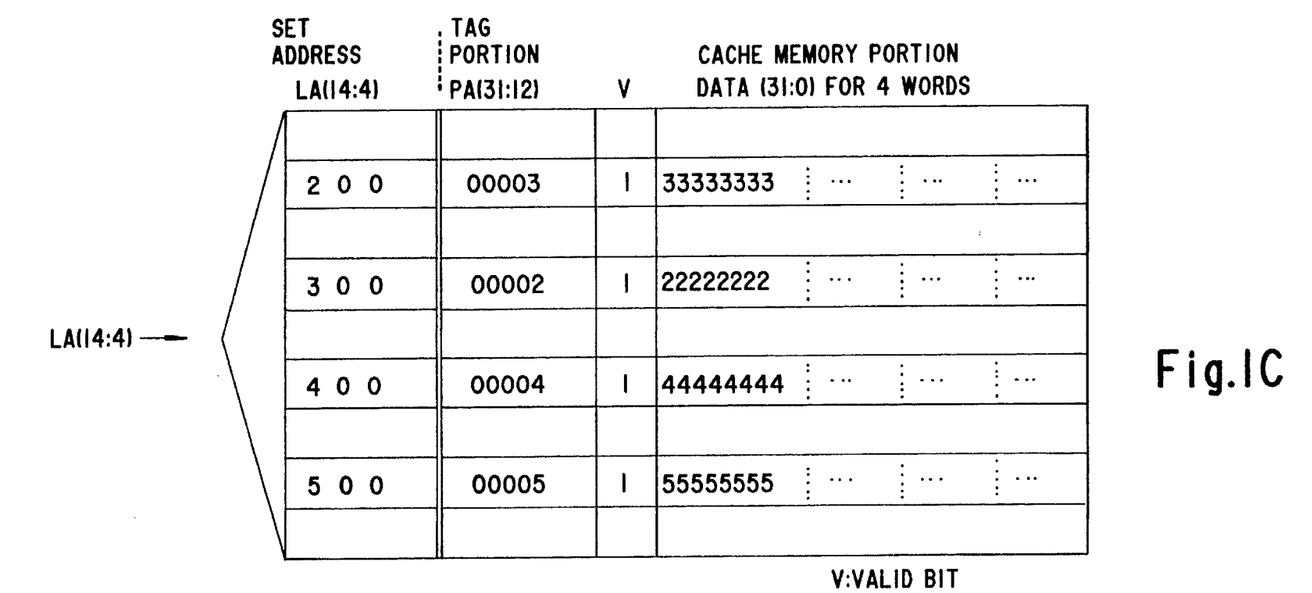

Views showing the state of the cache, shown in FIG. 1A, 1B and 1C, are explained. In the following explanation, LA represents a logical address and PA represents a physical address. LA(a:b) represents a bit series from the a-th bit to the b-th bit of the logical address. PA(a:b) represents a bit series from the a-th bit to the b-th bit of the physical address. In this example, both the logical address and the physical address comprise 32 bits. The highest bit is the 31st bit and the lowest bit is 0th bit.

The address translation table shown in FIG. 1A is provided and correspondence between the address and the data is as shown in FIG. 1B. The data is registered in the cache as shown in FIG. 1C in which the tag portion and the cache memory portion are shown.

When PA(31:1)=H'00003000 is provided on a system bus as an address to be address-monitored, and PA(14:4)=H'300 is a set address, PA(31:12)=H'0003 on the system bus is compared with H'0002 stored in the set address H'300 in the tag portion and as they do not coincide, the data stored in the set address H'300 is not subjected to any operation. PA(31:1)= H'00003000, which should be originally invalidated, remains.

When the portion of the logical address other than the offset portion is used as the set address of the cache, the physical address cannot determine the set address to be subjected to the address comparison.

Therefore, where the portion of the logical address other than the offset portion is used as the set address of the cache of the set associative structure, the conventional method cannot maintain consistency between the main memory and the internally-installed cache.

SUMMARY OF THE INVENTION

An object of the present invention is to maintain consistency between a main memory and an internally-installed cache even when the portion of the logical address other than the offset portion is used as the set address of the cache.

A feature of the present invention resides in a cache memory control system in a computer system comprising a main memory apparatus, a plurality of data processing apparatuses with respective CPUs and a system bus connecting them. The cache memory control system comprises a cache memory portion and a tag portion. They are provided in said CPU and have an N-way set associative structure. The cache uses A bits of an offset portion which is not subjected to the address translation of the logical address and a B-bit portion other than the offset portion. The B-bit portion is subjected to an address translation. The cache also uses an address monitor portion having a tag portion corresponding to the tag portion of the CPU using only A bits of the offset portion of the set address which are used as the set address in said CPU and having $2^B \times N$-way set associative structure and means for making the tag portion of the CPU correspond to the tag portion of the address monitor portion. Thus, it manages the N address stored in said tag portion and transmits the result of the address observation to the CPU and invalidates the corresponding recording portion of the tag in the CPU.

DETAILED DESCRIPTION OF THE PREFERRED EMBODIMENT

Figure 2A:
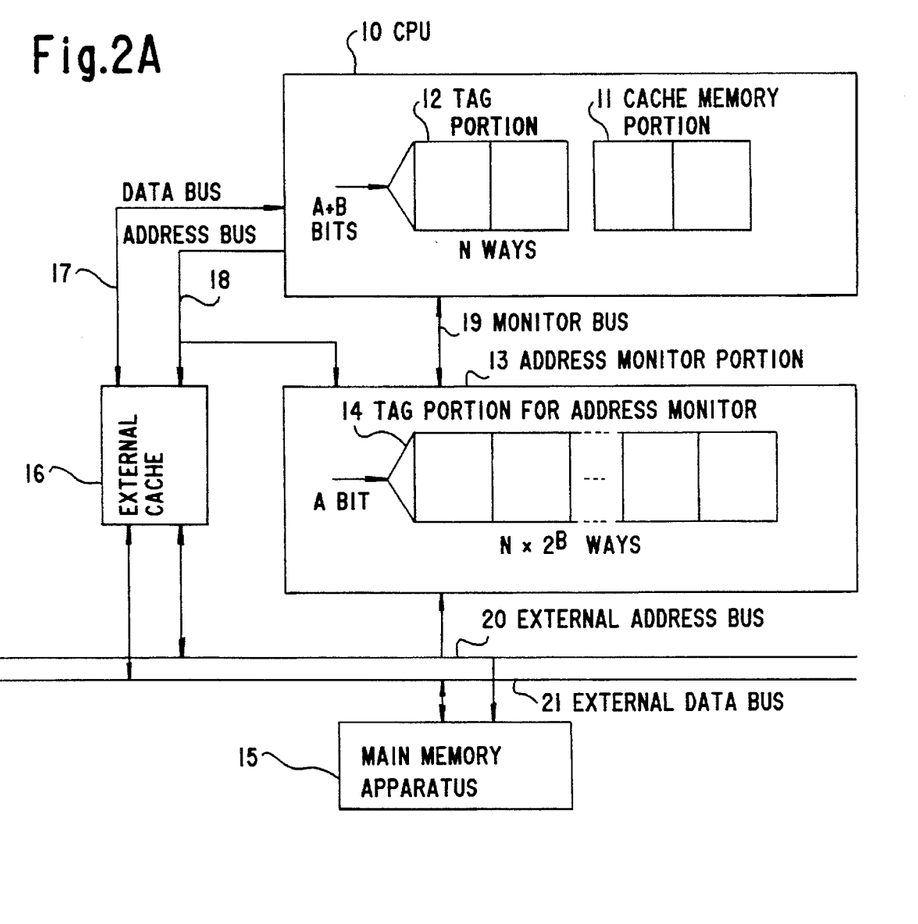
FIGS. 2A and 2B show examples of a structure of the present invention.
Figure 2B:
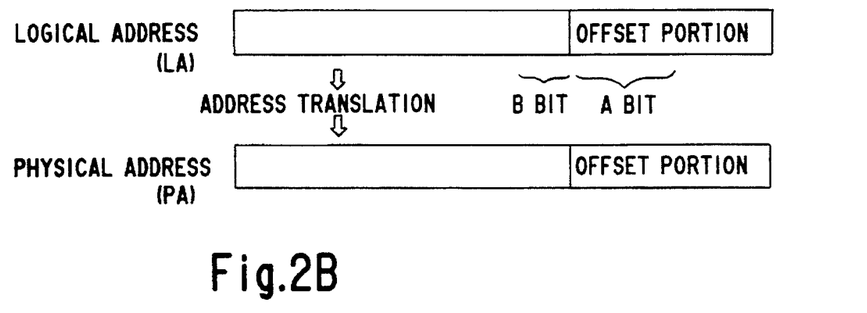

FIGS. 2A and 2B show the preferred embodiment of the present invention.

In FIG. 2A, CPU 10 performs an arithmetic operation and a memory management, for example. The CPU 10 contains a cache memory portion 11 and a tag portion 12 of the cache memory portion 11. An address monitor portion 13 is provided to the internally-installed cache and a tag portion 14 to the address monitor portion 13 corresponding to the tag portion 12 of the CPU 10. A main memory apparatus 15 stores a program or data processed by the CPU 10. An external cache 16 is provided to decrease the load of the system bus. It has a larger capacity than the cache installed in the CPU 10. A data bus 17 and an address bus 18 are connected to the CPU 10. A monitor bus 19 is connected between the CPU 10 and the address monitor portion 13. The data bus 17 and the address bus 18 are connected to an external data bus 21 and an external address bus 20, respectively, through the external cache 16.

The present system comprises a plurality of data of data processing apparatuses, a main memory apparatus 15, and a system bus comprising an external address bus 20 and an external data bus 21 which connect a plurality of data processing apparatuses and the main memory apparatus 15.

At least one of the data processing apparatuses comprises the CPU 10, the address monitor portion 13 and the external cache 16. The data bus 17 connects the CPU 10 and the external cache 16, and the address bus 18 connects the CPU 10 to the external cache 16 external the address monitor portion 13. The external address bus 20 connects the main memory apparatus 15 to the address monitor portion 13 and the external cache 16. The external data bus 21 connects the main memory apparatus 15 to the external cache 16.

In this embodiment, the CPU 10 and the address monitor portion 13 are formed of different chips. The CPU 10 performs an address translation from logical address LA to physical address PA by using the portion other than the offset portion as an object of the address translation, as shown in FIG. 1B.

The cache memory portion 11 and the tag portion 12 in the CPU 10 use A bits in the offset portion of the logical address and B bits in the portion other than the offset portion as shown in FIG. 1B. The cache is accessed by using a set address of (A+B)bits, thereby forming an N-way set associative structure.

The tag portion 12 has an address information recording portion for updating the address of the data stored in the cache memory portion 11 in the main memory apparatus 15 and a recording portion designating that the data of the cache memory portion 11 is effective.

The address monitor portion 13 is used for maintaining the consistency of the content of the cache memory portion 11 in the CPU 10 and the main memory apparatus 15. The address monitor portion 13 contains the address monitor tag portion 14, which uses only A bits of the offset portion of the set address used in the CPU 10 for accessing the tag portion 12 of the cache as the set address of the address monitor tag portion 14 and has $2^B \times N$-way set associative structures. That is, $2^B \times N$ regions (WAY0 to WAY15) exist in the address monitor tag portion 14, which is accessed by the set address (equal to A bits of the offset portion). When a set address is provided to the address monitor tag portion 14, a physical address is read out from a particular one (for example, WAY2) of 16 regions. This particular region is designated by B+log N when the physical address is written in the address monitor 13. In this embodiment, as the number N of the way is 2, and B comprises 3 bits, for example, B+log N=4 bits and one of 16 ways is selected as described in detail later by referring to FIG. 4 and 5.

In this data processing apparatus, the tag portion 12 of the CPU 10 is made to correspond to the address monitor tag portion 14 of the address monitor portion 13. The chip of the address monitor portion 13 performs an address monitor function, thereby sending the result of the monitoring function to the CPU 10, and then invalidating the corresponding recording portion of the tag portion 12 in the CPU 10.

In the present embodiment, when the address monitoring is performed as shown in FIG. 2A, the physical address of the external address bus 20 is compared with the content of $2^B \times N$ ways of the address monitor tag portion 14 for a set address of A bits. The result of the comparison of the respective ways ($2^B \times N$ ways) is converted to B bits of the set address of tag portion 12 in the CPU 10, a way signal and an invalidation enable signal designating whether the invalidation is performed and then is transmitted to the CPU 10.

The CPU 10 combines B bits with A bits of the offset portion of the physical address on the external address bus 20 which is transmitted through the monitor bus 19 and determines the corresponding address set of the tag portion 12 in the CPU 10 and invalidates a valid bit of the corresponding portion based on the way signal output from the address monitor portion 13, thereby maintaining consistency between the main memory apparatus 15 and the internally-installed cache in the CPU 10.

Figure 3A:
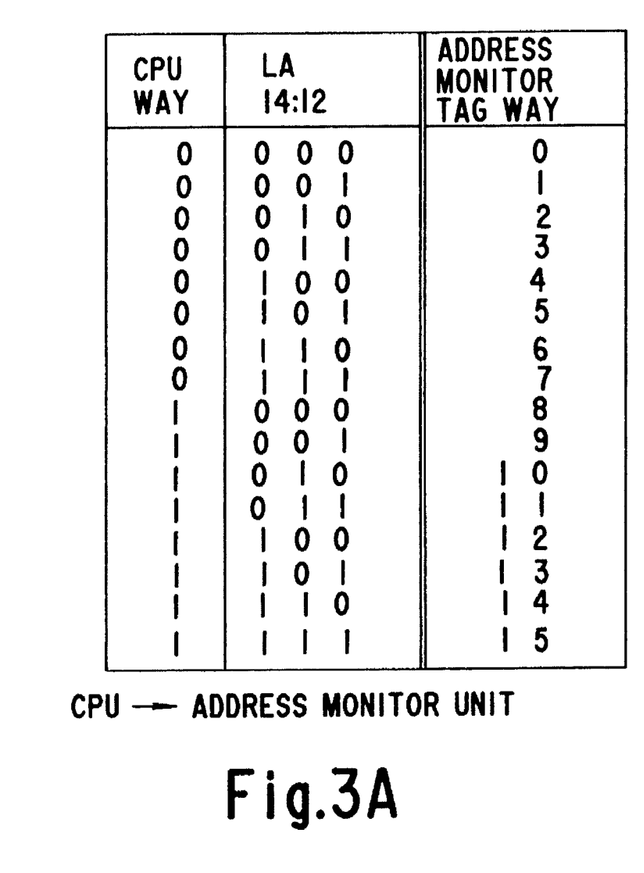
FIGS. 3A and 3B show explanatory views of the correspondence between a CPU and an address monitor portion in the preferred embodiment of the present invention.
Figure 3B:
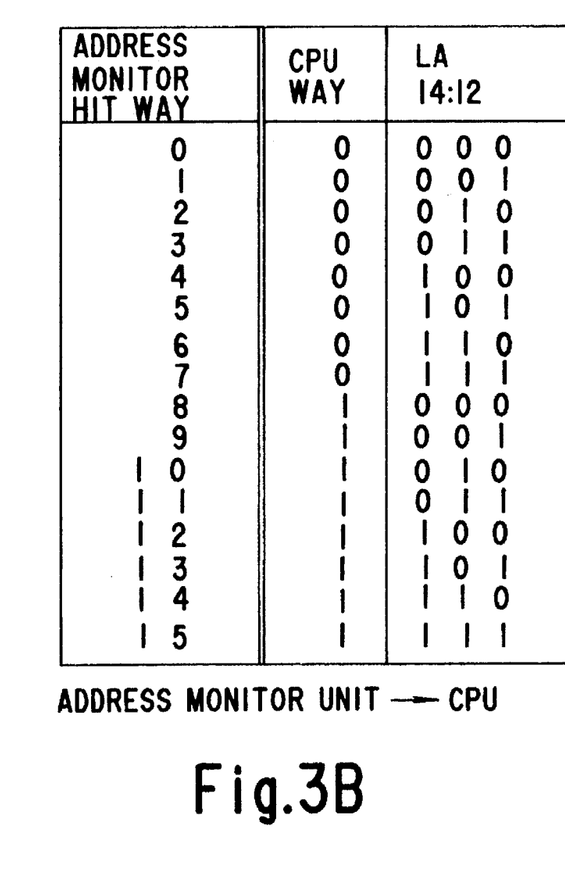
Figure 4:
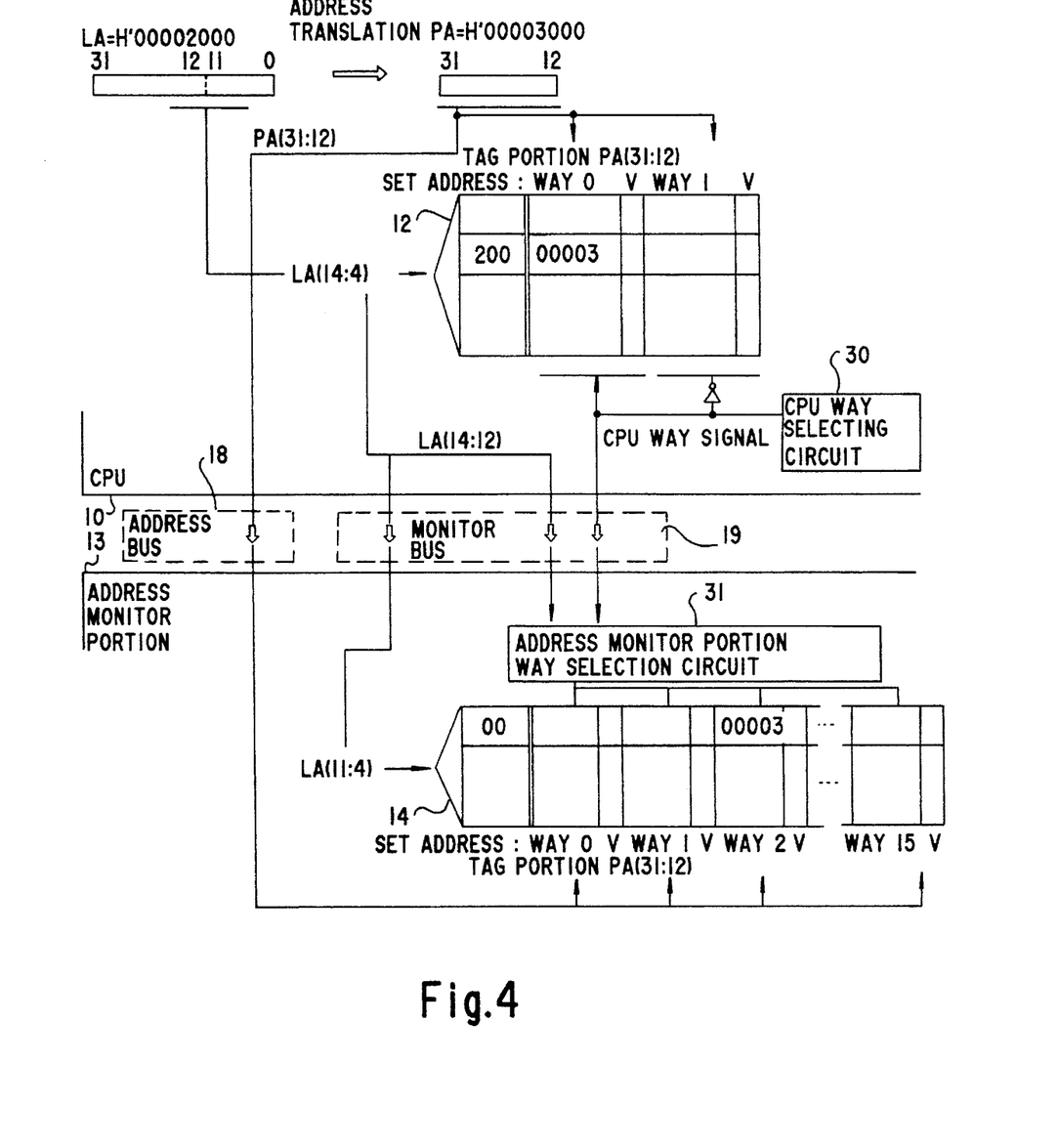
FIG. 4 shows an example of a data registration to a cache according to the preferred embodiment of the present invention.
Figure 5:
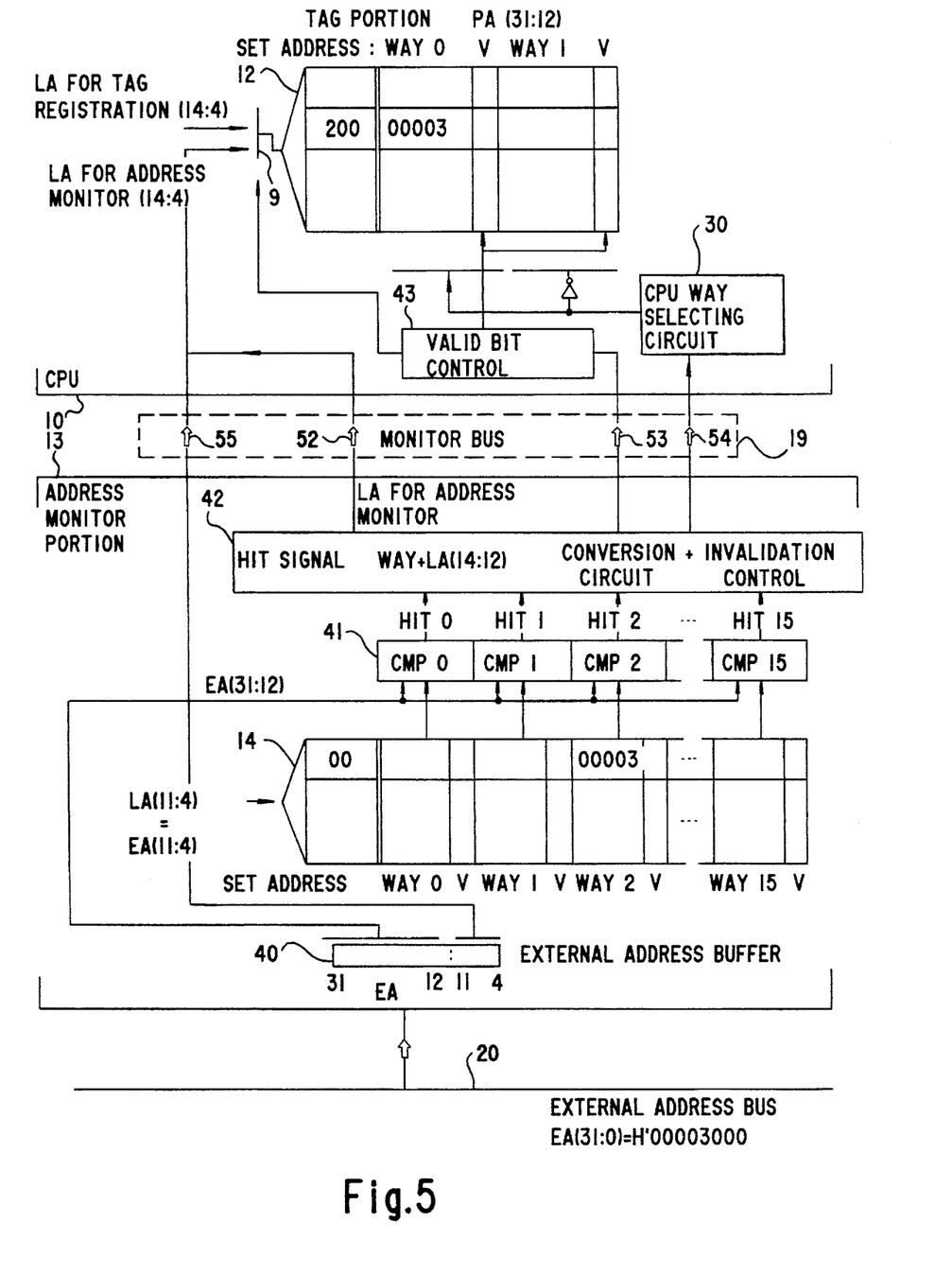
FIG. 5 shows an example of an address monitor according to the preferred embodiment of the present invention.
Figure 6A:
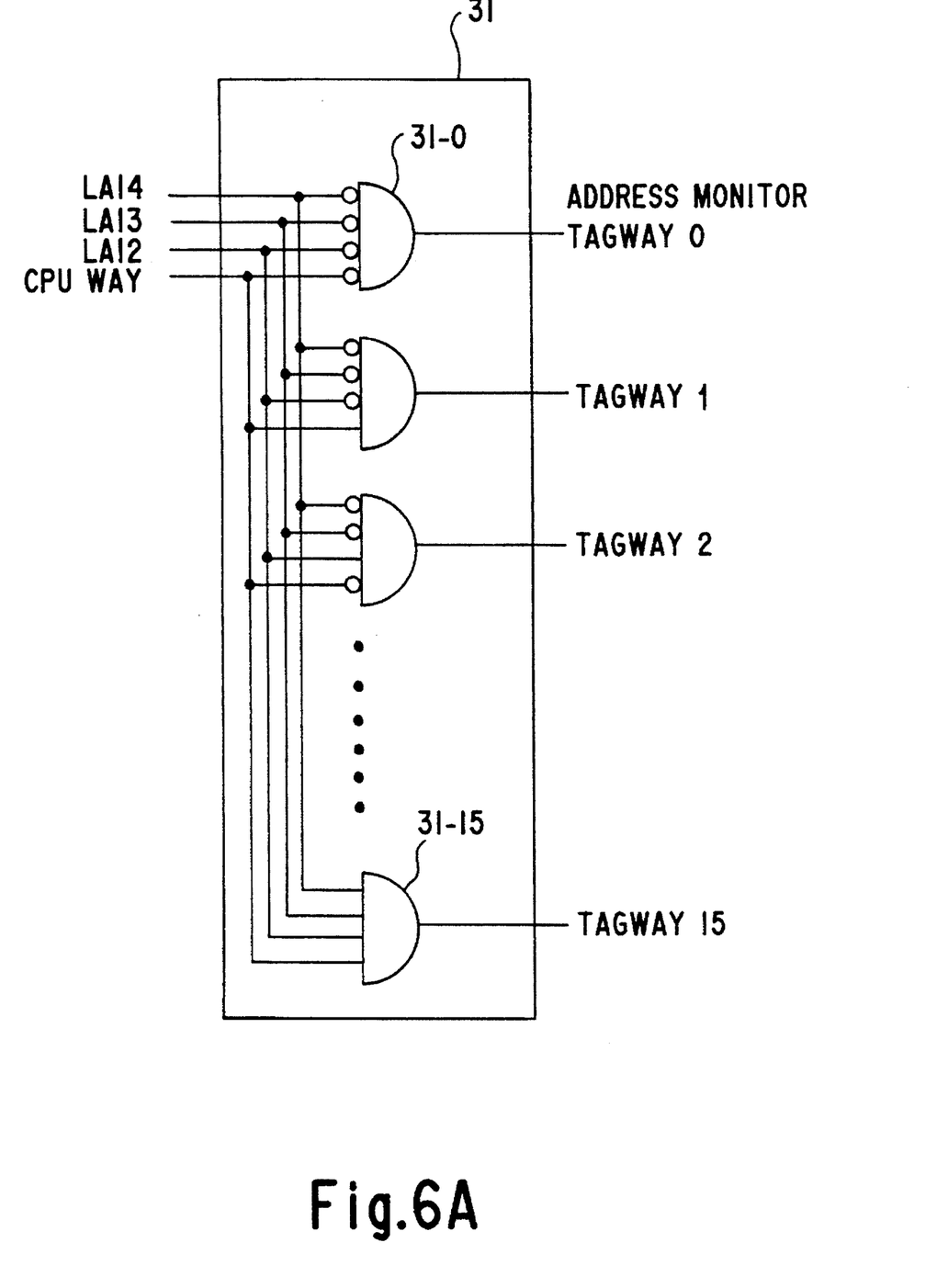
FIGS. 6A to 6D show circuit diagrams of the blocks shown in FIGS. 4 and 5.
Figure 6B:
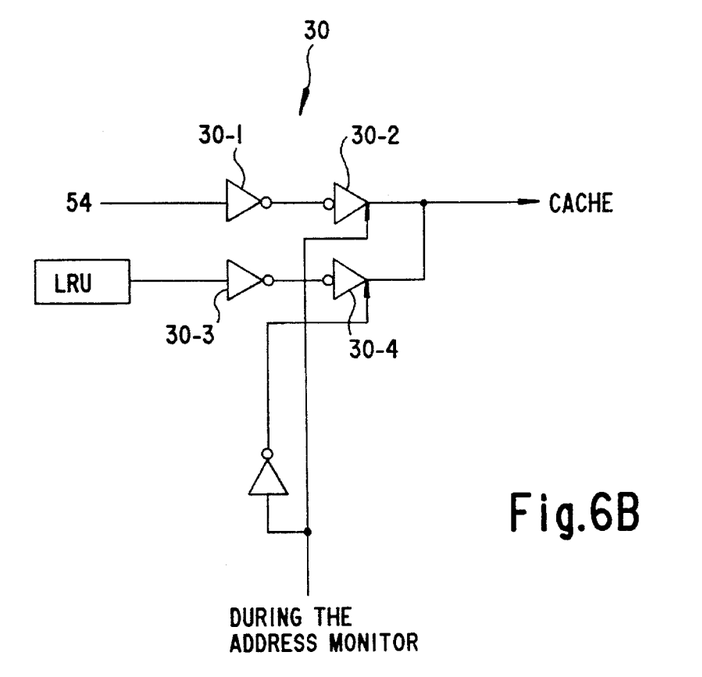
Figure 6C:
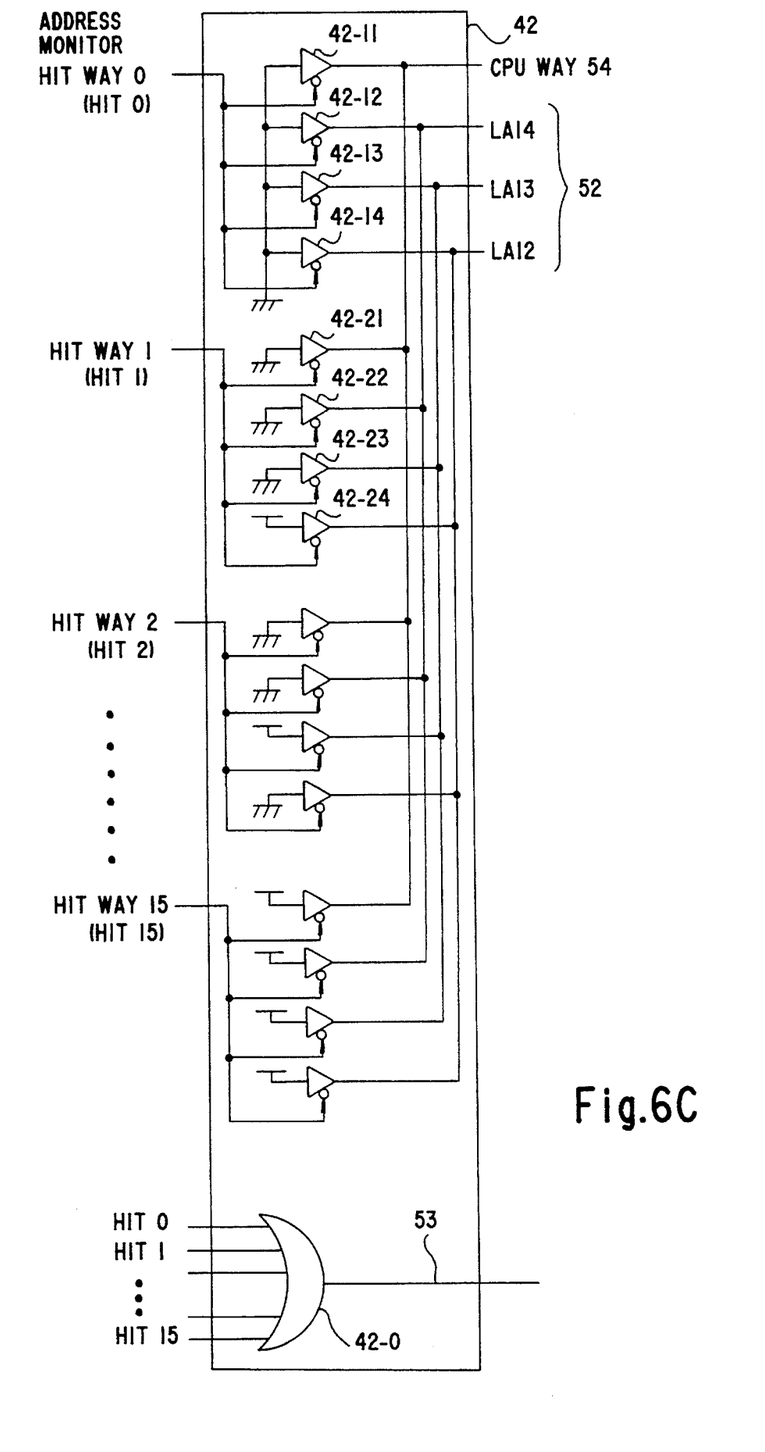
Figure 6D:
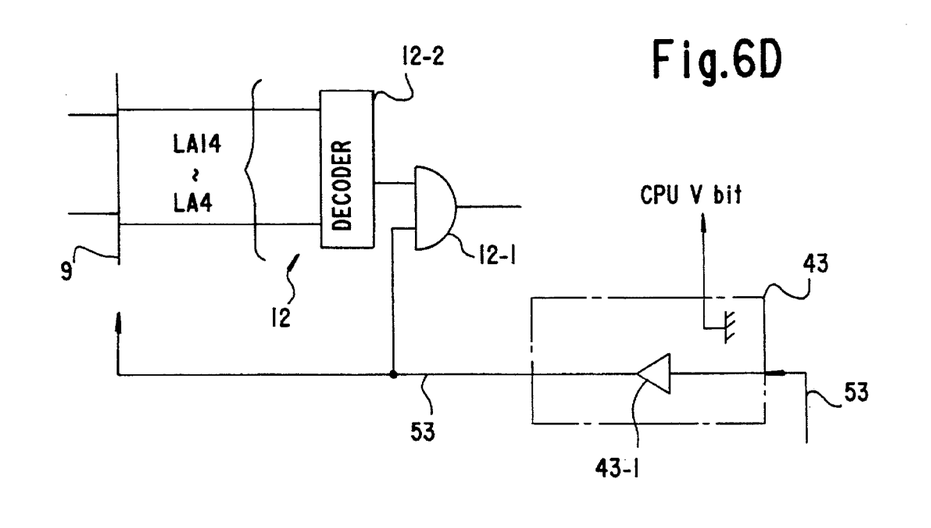
Figure 7:
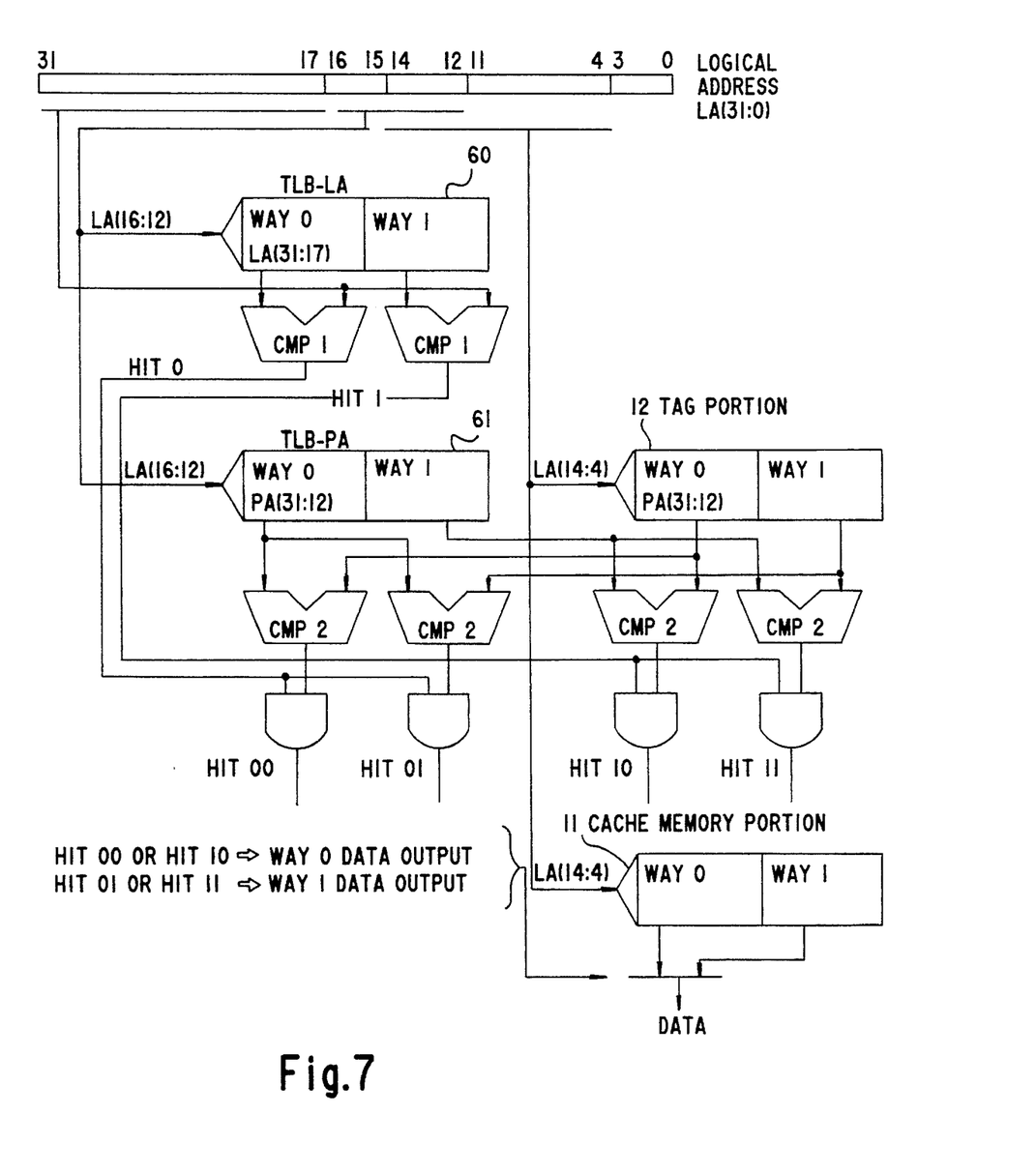
FIG. 7 shows a block diagram for explaining the relation between a TLB and cache according to the preferred embodiment of the present invention, and FIG. 8 designates a timing chart of a read operation in the block diagram in FIG. 7.
Figure 8:
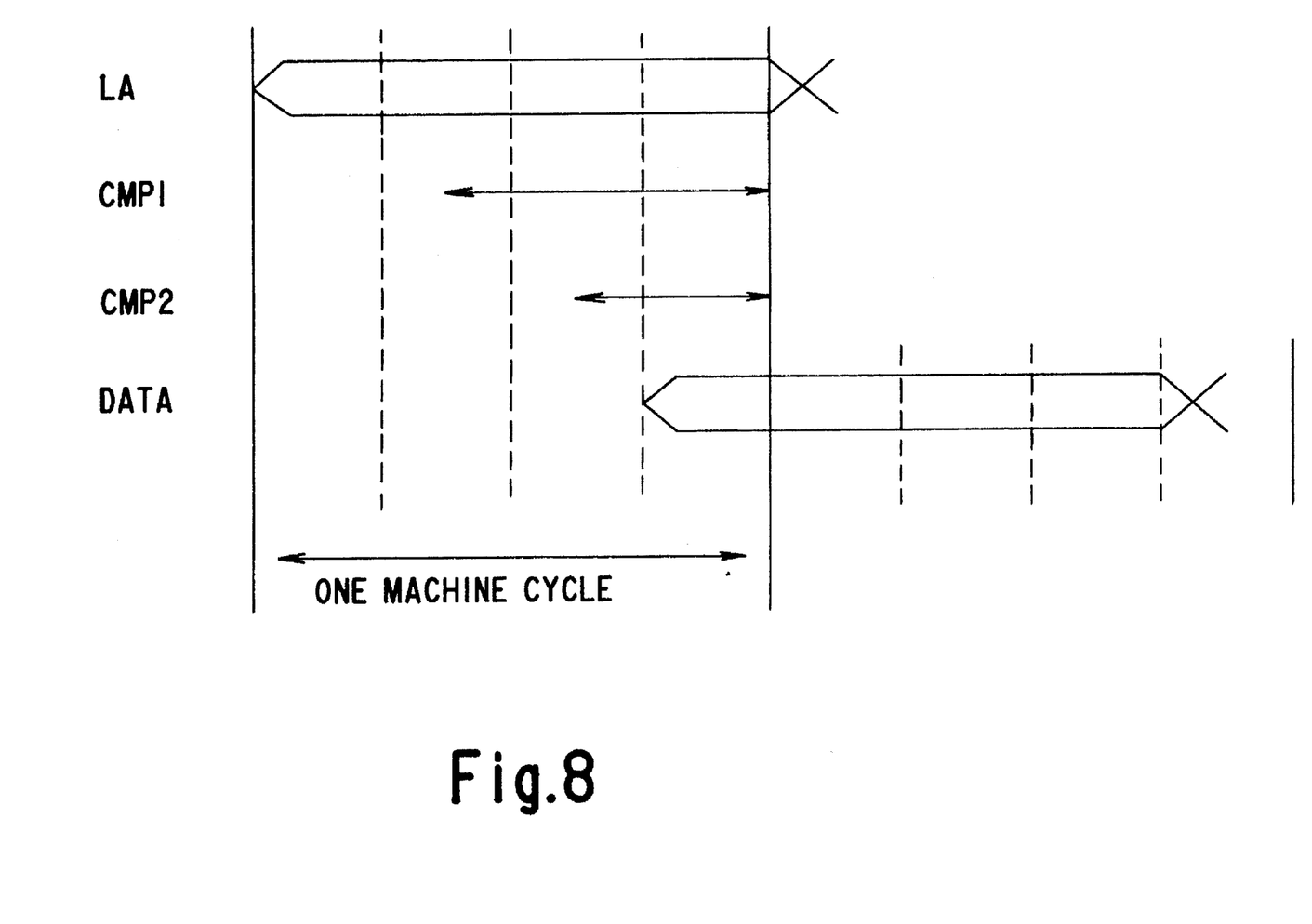

FIGS. 3A and 3B show the correspondence relation between the CPU and the address monitor portion in the preferred embodiment of the present invention, FIG. 4 shows an example of the data registration into the cache in the preferred embodiment of the present invention, FIG. 5 shows an example of the address monitor in the preferred embodiment of the present invention, FIGS. 6A to 6D show circuit diagrams of blocks shown in FIGS. 4 and 5, FIG. 7 shows a block diagram for explaining the relation between TLB and cache in the preferred embodiment of the present invention, and FIG. 8 shows a read operation timing chart for the block diagram shown in FIG. 5.

The preferred embodiment explained hereinafter has the following structure. These conditions can be changed in accordance with the system structure when the present invention is practiced.

1 The logical address LA comprises 32 bits and the offset portion comprises 12 bits of LA(11:0).

2 The block of the internally-installed cache memory in CPU comprises 16 bytes.

3 The structure of the internally-installed cache in the CPU comprises a 2-way set associative structure.

4 The internally-installed cache memory in the CPU comprises 32 Kbytes.

5 The tag portion of the address monitor portion comprises a 16-way set associative structure of the set address of LA(11:4).

According to the above condition 4, LA(14:4) is used as the set address of the cache installed in the CPU.

Firstly, the case in which data is registered in the cache is explained by referring to FIGS. 2A, 2B and 4.

The logical address designated by the program is subjected to an address translation and is translated to the physical address, which is output to address bus 18. The CPU 10 receives 16 bytes of data to be registered from the external cache 16 through the data bus 17.

Then, the CPU 10 registers a physical address PA(31:12) (for example, 00003) corresponding to the data registered in the set address (for example, 200) corresponding to the logical address LA(14:4) and in the way (for example, WAY0) designated by the CPU-way selecting circuit 30 with regard to the tag portion 12 in the CPU 10, thereby invalidating the valid bit. In this example, 16 bytes of data are registered in the set portion in the cache memory portion 11 in the same way as in the tag portion 12. However, this is not directly related to the present invention so its detailed explanation is omitted.

At the same time, the above-recited physical address PA(31:12) is registered in the way given by CPU way number+logical address LA(14:12) and in the set address given by the logical address LA(11:4) for the address monitor tag portion 14 of the address monitor portion 13.

FIG. 3A shows a correspondence table between a signal transmitted from the CPU 10 to the address monitor unit 13 and the way of the address monitor tag portion 14. The address monitor portion way selecting circuit 31 controls the selection of a way in accordance with this table.

For example, as shown in FIG. 4, suppose that, as a result of the address translation, the logical address is H'00002000 and the physical address is H'00003000. The set address A+B applied to the cache comprises LA(14:4) and can be expressed as 200 in hexadecimal numbers. In this instance, 200 is used as the set address of the cache in CPU 10, and the CPU way selecting circuit 30 designates WAY0, 00003 of PA(31:12), namely, H'00000300 of the physical address is stored at the address 200 of the tag portion 12 and the validity indicating bit is made valid.

Simultaneously, the way selection signal (WAY=0) provided by the CPU way selecting circuit 30 and the logical address LA(14:12)=B'010 (which corresponds to B of A+B in FIG. 2A) are input to the address monitor portion way selecting circuit 31 and WAY2 is selected as a way of address monitor tag portion 14 based on the third line of the correspondence table shown in FIG. 3A.

00003 is registered at the place designated by logical address LA(11:4), i.e. 00 of LA 200 in FIG. 4, i.e., 0 address and WAY 2, and the valid bit is simultaneously made valid. One of 16 ways is selected the number of ways being determined by LA(14:12), i.e., three bits. The number of ways can be generally expressed as $2^B$. In this manner, the same physical address is registered in the tag portion 12 of the CPU 10 and in the tag portion 14 in the address monitor portion 13.

Next, an operation of the address monitor for performing an invalidation operation of the cache memory is explained by referring to FIG. 5. The invalidation of the cache is performed by detecting that PA(31:12) of the physical address produced on the address bus when the other CPU rewrites the main memory apparatus is stored in the address monitor portion; by decoding the way number of the address monitor portion when the physical address (31:12) exists in the address monitor portion, thereby providing B bits and combining them with the A bits to provide A+B bits; and by invalidating the content of the cache memory address designated by the A+B bits.

First, an external address EA (31:0)= H'000030000, i.e., the physical address PA to be monitored, is latched in the external address buffer 40 of the address monitor portion 13 and the set to be monitored is determined by using (11:4) of EA, i.e., 00 of 3000 of the external address EA, which is the offset portion and is thus equal to the logical address (11:4). Thus, the logical address (11:4) is used to access the address monitor portion 14, and the 0 address of the address monitor portion 14 is accessed. Then, as shown in FIG. 4, the 0 address of the address monitor portion 14 outputs 0003 in WAY2, which is written in the address portion 00 in the address monitor portion 14. 0003 is physical address (31:12) and is equal to external address EA (31:12). The physical address of respective ways WAY0–WAY15 registered in address monitor tag portion 14 are respectively compared with (31:12) of the external address EA by the address comparison portion 41.

As a result, if the physical address accords with (31:12) of the external address EA, the circuit 42 for signal translation and invalidation control converts the HIT signal of the WAY2 to the CPU WAY0 and the address monitor logical address LA(14:12), namely B bits, which should be used for the invalidation, in accordance with the third line of the correspondence relation table shown in FIG. 3B, and transmits the CPU way and the address monitor logical address to the CPU 10. Only HIT2 of CMP2 selected from among CMP0 to CM15 becomes 1 and the other HIT signals become 0. Then the signal of HIT2 is decoded to provide the B bits (B'110). As the A bits of LA(14:11) already exist, the B bits are connected to the upper side of LA(14:11), thereby providing LA(14:4) to tag portion 12 through selector 9. The circuit 42 also outputs to the CPU 10 the invalidation enable signal 53 (obtained by the logical OR of HIT signals) designating whether the cache should be invalidated or not.

The CPU 10 combines the above output (B bits) from the circuit 42 with the external address EA(11:4), namely, address monitor logical access LA(11:4), to provide the set address and access the tag portion 12 by using the set address. The address monitor tag portion 14 has a valid bit, so the address which is hit in the address monitor portion 13 should always be hit in the CPU 10. Therefore, the valid bit to be accessed by the tag portion 12 of the CPU 10 is invalidated.

Comparison with the corresponding portion of the address monitor portion 13, namely, external address EA, is performed simultaneously. Then, the valid bit of the portion which accords with the external address EA is invalidated. The external cache 16 shown in FIG. 2A performs an address monitor function for itself.

If the address 3000 is in the external address bus 20 and the address monitoring operation is required in FIG. 5, the external address EA(31:4) is first input and latched in the external address buffer 40. Then, the set address of the address monitor tag portion 14 becomes 00 based on (11:4) of the external address EA. WAY0–WAY15 designated by the set number is compared with the external address EA(31:12) =00003 and then HIT2 is asserted.

As other HIT lines are not asserted, the invalidation way 54 designating the way of the tag portion 12 in the CPU 10 is determined as WAY0, and the address monitor logical address LA(I 4:12)=B'010 for the set address in accordance with the correspondence table shown in FIG. 3B. Thus, the invalidation enable signal 53 is also asserted. The external address EA(11:4) is simultaneously transmitted to the CPU 10, and the valid bit of the set address=00 and way=2, which are hit in address monitor tag portion 14, are invalidated.

The CPU 10 uses the address transmitted from the address monitor portion 13 as the set address of the tag portion 12 and receives the invalidation way 54 as the input. The CPU way selecting circuit 30 selects WAY0 to be invalidated and the valid bit control circuit 43 invalidates the valid bit selected by the above set address and the way.

Where the external address EA does not accord with the address of the address monitor tag portion 14, the invalidation enable signal 53 is put in a negate state so that the CPU 10 does not perform the invalidation process, but instead performs the ordinary process.

The above embodiment uses, as the monitor bus 19, logical address LA(14:4) for the bus from the CPU 10 to the address monitor portion 13, the CPU way signal external the address monitor logic address LA(14:12) for the bus from the address monitor portion 13 to the CPU 10, the invalidation enable signal 53, the invalidation way 54 and the external address EA(11:4) 55. The comparison signal of the chip of the address monitor portion 13 may be directly output to the CPU 10 and translated to the logical address on the CPU 10 side. When an address is registered in the address monitor unit 13, the above embodiment uses address bus 18. However, instead, by increasing the number of the monitor 19, the monitor bus 19 can be used for registering the address in the address monitor unit 13.

FIG. 6A shows the detailed structure of the address monitor portion way selecting circuit 31, which comprises a decoder. The selecting circuit comprises inverters and 16 AND circuits 31-0 to 31-15. The logical address 12, 13 and 14 and CPU way are input to each of AND circuit 31-0 to 31-15, which produce address monitor TAG WAY0 to 15, respectively. When addresses 12, 13 and 14 and CPU WAY are at "L" level, "H" is output as TAG WAY0 of the address monitor from AND circuit 31-0.

FIG. 6B shows a detailed circuit of the CPU way selecting circuit 30. The way selecting signal 54 is input to inverter 30-1 and then 30-2 and the output of the LRU is also provided to inverter 30-3 and then 30-4. The output of inverter 30-2 is put in the enable state by the address monitor signal during the period of the address monitor operation.

Thus, the way selecting signal 54 is transmitted to the cache through the CPU way selecting circuit 30 when the address monitor is not being performed, i.e., in ordinary time, and the buffer 34-4 is put in the enable state to transmit the output of the LRU to the cache.

FIG. 6C shows the detailed structure of the HIT signal to way+LA(14:12) conversion circuit and the invalidation control circuit 42. The conversion and the invalidation control circuit 42 comprises a decoder comprising 16 sets of four buffers. The address monitor hit way 0 signal (HIT0) is input to the gates of buffers 42-11, -12, -13 and -14 and the inputs of these buffers are grounded. Thus, when the HIT 0 signal is made at "L" level, buffers 41-11, -12, -13 and -14 produce "L" level signals of the CPU way signal 54 and logical addresses 14, 13 and 12, respectively, and LA14, 13 and 12 form the signal 52 in FIG. 5. In the same manner, the HIT way 1 signal is provided to buffers 42-21, -22, -23 and -24 and the inputs of these buffers are grounded and the input of buffer 42-24 is pulled up. Therefore, when the HIT 1 signal is made at "L" level, the CPU way 54 and logical addresses 14 and 13 are made at "L" level but logical address 12 is made at "H" level. Therefore, by detecting the output of the circuit 42, the HIT signal which is made active can be obtained. HIT 0 to 15 signals are input to OR circuit 42-0 to produce a valid bit signal. When all of the HIT 0 to 15 signals are at "L" level, the invalidation enable signal 53 is inactive. Thus, the valid bit of the cache is not invalidated because the address designated by such physical address is not stored in the cache.

FIG. 6D shows the detailed structure of the valid control circuit 43, in which the ground signal is provided to the valid bit of the cache memory portion. The invalidation enable signal 53 is transmitted to the selector 9 and tag portion 12 through buffer 43-1.

The selector 9 selects the address monitor logical address (14:4) when the output of the valid control circuit 43 is active. The AND circuit 12-1 is provided at the output of the decoder 12-2 corresponding to the respective logical addresses (14:4). When one set address of the cache is selected by the logical address (14:4) through the decoder 12-2 and the invalidation enable signal 53 is also made active, the AND circuit 12-1 provides an active output so that the signal (ground signal in the valid bit control circuit 43 is written into the valid bit of the cache register, making the particular address data invalid.

Next, the relation between TLB (Translation Lookaside Buffer) and the cache can be explained in this embodiment by referring to a block diagram shown in FIG. 7. FIG. 8 shows a timing chart of the read operation in the block diagram shown in FIG. 7.

Both the TLB and the cache use a 2-way set associative method, for example.

When the data is registered in the cache, it is first necessary to cause a cache miss. In this embodiment, as the structure shown in FIG. 7 is utilized, the TLB and the tag portion 12 are accessed within one machine cycle.

When the logical address 60 and the physical address 61 are accessed by the TLB by using logical address LA(16:12), logical address LA(31:17), which can be translated to a physical address, is registered in logical address portion 60 in TLB. Physical address portion 61 registers physical address PA(31:12) to be obtained by the address translation.

Comparison circuit CMP1 compares an actual logical address LA(31:17) with the portion read from WAY0 and WAY1 of the logical address portion 60 of TLB, thereby detecting whether the physical address is registered in TLB. When both hit0 and hit1 are "0", TLB miss is caused, thus moving the process to the dynamic address translation (DAT).

Comparison circuit CMP2 compares the WAY0 and WAY1 of the physical address PA(31:12) read from the physical address portion 61 of the TLB with the WAY0 and WAY1 of the physical address PA(31:12) read from the tag portion 12.

The output of comparison circuits CMP1 and CMP2 produces hit signal H1T00–HIT11 designating a hit. In case of HIT00 or HIT10, data of WAY0 read from the cache memory portion 11 is output and in case of HIT01 or HIT11, the data of WAY1 read from the cache memory portion 11 is output.

There is a case where a plurality of logical addresses LA designate one physical address PA depending on the manner of operation of a program performed by an operating system. In this case, when the logical address LA(14:12) is not the same, the data cannot be mapped in the same physical address.

To solve this problem, the following solution is considered.

(1) A certain limitation is provided upon forming an address translation table.

(2) Upon a TLB miss, the data is not registered in the cache.

i) The data is also not registered in the TLB. In this case, the number of DAT increases and the merit achieved by extending the size of the cache becomes suppressed.

ii) If the data does not exist in the main memory apparatus, it is registered in the TLB after it is fetched from the bit. Upon a TLB miss, the whole entry of the physical address portion 61 of the TLB shown in FIG. 7 is compared with the physical address corresponding to the logical address which causes the TLB miss.

When there is no hitting data, the data is registered in the TLB and the process is moved to the next stage and data can be also registered in the cache. If hitting data exists, it is not registered in the cache by validating the NC (non-cacheable) flag of the TLB corresponding to the entry causing the TLB miss when the data is registered in the TLB.

In the above method recited in (2), the performance of the apparatus may decrease, thus suppressing the merit achieved by enlarging the size of the cache. Therefore, considering the performance of the apparatus, it is practical to provide a limitation to the address translation table so that, when the logical address LA(14:12) of (1) is not the same, the data cannot be mapped in the same physical address. A solution may be considered, but this is not directly related to the subject of the present invention so its detailed explanation is omitted.

As explained above, where the internally-installed cache of the CPU 10 has an N-way set associative structure and the portion other than the offset portion of the logical address is entered in the set address, it becomes possible to perform the address monitor and to thus maintain consistency between the main memory and the internally-installed cache. Therefore, the installed cache can be made large, contributing greatly to the improved performance of the data processing apparatus.

What is claimed is:

1. A cache memory control system for use in a computer system including a main memory apparatus; a plurality of data processing apparatuses with respective CPUs, said respective CPUs receiving data on a data bus and logical addresses on an address bus, and said respective CPUs performing address translation of the logical addresses which are received so as to translate the logical address to a physical address; and a system bus connecting said data processing apparatuses and said main memory;

said cache memory control system comprising:

a cache memory portion and a tag portion, which are provided in each of the said respective CPUs, said tag portion receiving a logical address having A bits in an offset portion and B bits in a portion other than said offset portion, said cache memory portion having A bits of said offset portion of said logical address, and said B bits of said portion other than said A bits of said offset portion; said A bits not being subjected to an address translation of said logical address, and said B bits being not included in the physical address when the logical address is translated to the physical address wherein, when the cache memory portion and tag portion is accessed by the logical address, the cache memory portion and tag portion is accessed by said A bits of the offset portion of its logical address and said B bits in other portions than the offset portion of said logical address; and an address monitor portion having a tag portion, said address monitor portion storing physical address information stored in said tag portion provided in the CPU at a region corresponding to said B bits of the logical address and using only said A bits of the offset portion of a set address which is used as the set address in said CPU and having a $2^B \times N$-way set associative structure, and said address monitor portion having means for causing an address stored in said tag portion provided in said CPU correspond to the corresponding address stored in said tag portion of said address monitor portion, wherein, when the cache memory portion and the tag portion are accessed by the physical address, the address monitor portion is accessed by the A bits of the physical address transmitted through an external bus, a part of the physical address is compared with the physical address information stored in the address monitor portion by using the A bits of the physical address, a position information of the region at which the part of the physical address accords with the physical address information stored in the address monitor portion in which each physical address information is stored in each of $2^B \times N$ regions and is selected by using said A bits as a set address is encoded to provide the B bits, thereby invalidating the cache memory portion and its tag portion by using said logical address which is composed of said A bits and said B bits, so that, when another CPU updates the contents of the physical address, the corresponding contents of said cache memory portion is invalidated.

2. A cache memory control system internally installed in a CPU, comprising:

a first memory to be accessed by an address having A bits concatenated with B bits;

a second memory to be accessed by an address having A bits, and said second memory comprising $2^B$ regions in an address designated by A bits;

means for writing information into said address of said first memory designated by said A bits concatenated with B bits and for writing said information into one of $2^B$ regions corresponding to a binary code of B bits in said address designated by said A bits in said second memory during a registration operation;

comparison means for, when external information including said A bits and said information is provided, and said second memory is accessed by using A bits of said external information, reading the content of said address designated by A bits and comparing the content of respective $2^B$ regions which are read-out with said information of said external information, and detecting a region in which the read-out information accords with said information of said external information;

converting means for converting through an encoding operation a position information of one of the regions $2^B$ at which the read-out information accords with said information of said external information; and invalidating means for combining said B bits with said A bits to provide A bits concatenated with B bits, thereby accessing said first memory and invalidating the content of the accessed address of said first memory by using said A bits concatenated with B bits.

3. The internally-installed cache memory control system according to claim 2, wherein said A bits comprise predetermined bits of an offset portion of a logical address which is the same as offset portion of a physical address.

4. The internally-installed cache memory control system according to claim 2, wherein said B bits comprise predetermined bits other than the offset portion of the logical address and does not exist in the physical address.

5. The internally-installed cache memory control system according to claim 2, wherein said first memory comprises a tag portion and a cache memory portion addressed by said A bits concatenated with B bits, and wherein said information comprises a physical address corresponding to a logical address.

6. The internally-installed cache memory control system according to claim 2, wherein said second memory forms an address monitor means comprising a set address designated by A bits, the region corresponding to said set address being divided into $2^B$ regions corresponding to B bits and for writing the information in one of $2^B$ regions at the address designated by A bits.

7. The internally-installed cache memory control system according to claim 2, wherein said B bits are bits which are provided next to an offset portion of a logical address.

8. The internally-installed cache memory control system according to claim 2, wherein said external information comprises a logical address provided by another CPU which supplies the logical address on an external bus.

9. The internally-installed cache memory control system according to claim 2, wherein said external information is supplied on an external address bus and comprises a physical address produced when another CPU updates the content of said main memory which corresponds to said physical address, said address monitor means comprises $2^B \times N$ regions in respective addresses and the tag portion and cache memory portion accessed by the A bits concatenated with the B bits is invalidated.

10. A cache memory control system, comprising:

a memory to be accessed by a physical address on an external address bus, said physical address being composed of A bits concatenated with B bits, said A bits comprising an offset portion of said physical address on the external address bus;

an address monitor portion to be accessed by said A bits;

comparing means for reading a physical address from said address monitor portion by using said A bits of said offset portion of said physical address on said external address bus, for comparing the physical address read from the address monitor portion with the physical address carried on the external address bus, to select a position information corresponding to one of $2^B$ regions;

conversion means for encoding the position information obtained as a result of the comparisons to produce converted information comprising B bits; and invalidation control means for forming said A bits concatenated with B bits by using B bits from the converted information produced by the conversion means and A bits of an offset portion of physical address carried by the external address bus, said invalidation control means supplying an address having A bits concatenated with B bits to a tag portion of a cache, and said invalidation control means causing a valid information stored in the memory to become inactive in order to invalidate the content of said memory corresponding to the address provided by A bits concatenated with B bits which are supplied by said invalidation control means.

11. A memory control system comprising:

a first memory to be accessed by a logical address including A bits concatenated with B bits;

a second memory which is accessed by another address, said another address being composed of A bits, and wherein said second memory comprises $2^B$ regions in said another address designated by A bits;

means for writing a part of a physical address into an address of said first memory designated by A bits concatenated with B bits and writing the same physical address as written in the first memory in at least one of said $2^B$ regions in said address designated by A bits in the second memory during a registration operation;

comparison means for, when external information including said A bits and bits representing the physical address is provided to the second memory, accessing the second memory by using A bits of the external information, reading the content of said address designated by A bits and comparing the content of the respective $2^B$ regions with said part of the physical address of said external information, and detecting the region in which the part of the physical address stored in the region accords with the part of the physical address of the external information during an address monitor operation; and invalidating means for producing B bits by encoding the result of said comparing means, combining the B bits with the A bits to provide A bits concatenated with B bits, thereby accessing said first memory and invalidating information stored in said first memory by using A bits concatenated with B bits when an external CPU changes the content in a main memory which corresponds to the physical address.

12. A memory control system comprising:

a first memory to be accessed by A bits concatenated with B bits, and wherein said first memory has information written therein; and an address monitor means comprising:

a second memory for storing said information in one of $2^B$ regions of an address of said second memory, said region being determined by information corresponding to said B bits and said address being accessed by said A bits, and means for reproducing said B bits based on region in which external information coincides with said information in said second memory, thereby producing A bits concatenated with B bits in said first memory.

13. The memory control system according to claim 12, wherein said first memory comprises a tag portion and a cache memory portion;

said second memory comprises an address monitor;

said A bits comprise an offset portion of a physical address;

said B bits comprises a portion other than said offset portion of said physical address;

said logical address being comprised of said A bits concatenated with said B bits for accessing said first memory; and said A bits for accessing said second memory are a part of said offset portion of said physical address.

* * * * *